Aug. 4, 1953     L. H. SCHAEPERKLAUS     2,647,394
METHOD OF DETERMINING THE SPECIFIC GRAVITY
AND WATER CONTENT OF CONCRETE AGGREGATES
Filed Feb. 4, 1950
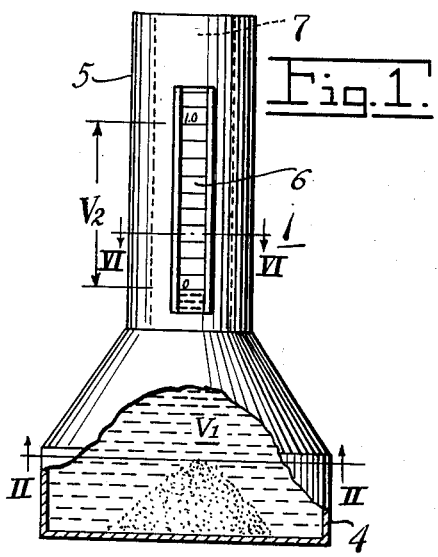
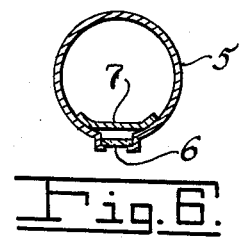
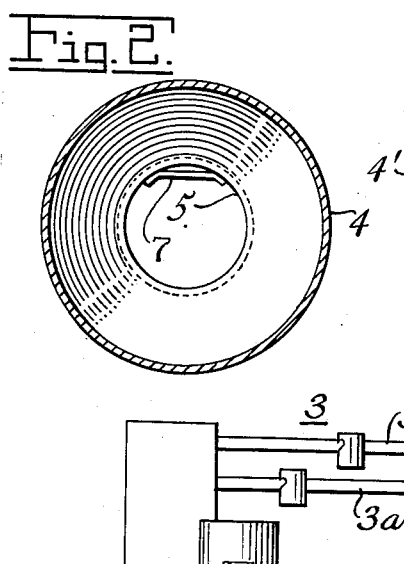
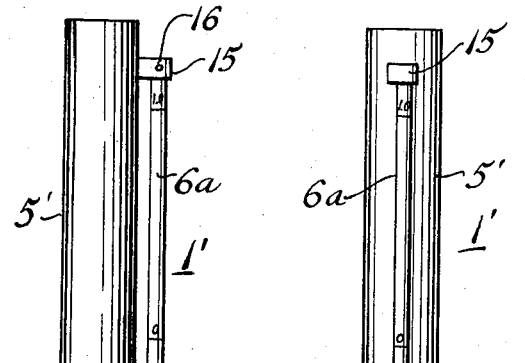
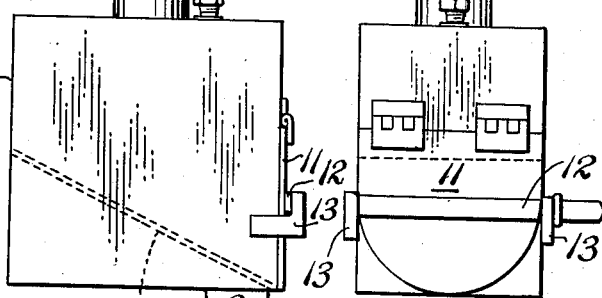
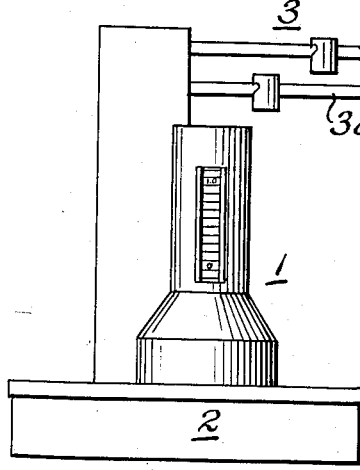
INVENTOR.
LOUIS H. SCHAEPERKLAUS
BY
Zugelter & Zugelter
Attys.

Patented Aug. 4, 1953

2,647,394

UNITED STATES PATENT OFFICE 2,647,394

METHOD OF DETERMINING THE SPECIFIC GRAVITY AND WATER CONTENT OF CONCRETE AGGREGATES

Louis H. Schaeperklaus, Cheviot, Ohio

Application February 4, 1950, Serial No. 142,386

3 Claims. (Cl. 73—32)

This invention relates to the production of concrete containing cement, water, and aggregates consisting of sand or sand and gravel or crushed rock. More particularly, the invention relates to a method of controlling the total water content of a concrete so that a substantially constant ratio of water to cement may be maintained. The invention relates also to a method for determining quickly, accurately, and directly the specific gravity of the aggregates and the amount of water contained by the aggregates, without the necessity of drying said aggregates, whereby a predetermined ratio of water to cement can be more accurately maintained in concrete mixes made at the site of a construction project regardless of any variations in the specific gravity of the supply of aggregates or the water content thereof at such site.

It is recognized by engineers and designers of concrete for various construction projects and purposes, that the amount of aggregate required in a given design of concrete is dependent upon the specific gravity of the aggregate used, and that the strength and durability of concrete is greatly affected by the ratio of water to cement in the concrete. It is also recognized that when a given design of concrete mix is to be used in the construction of a concrete structure, it is of prime importance to maintain the ratio of water to cement constant.

A wet aggregate consists of a mixture of dry aggregate and water. The true mix in a concrete batch is dependent upon the water added to the mix as such, and to the amount of water and aggregate added to the mix by reason of surface water on the wet aggregates employed.

Since the supply of aggregate at the site of a construction project usually is in the form of a stock pile which is more or less wet, depending on the weather and rainfall thereon, the water content of the wet aggregate will vary from day to day or even more frequently. It is therefore necessary to know the amount of water and dry aggregates in the wet aggregate as taken from the stock pile, so that this amount of water may be compensated for and included as part of the total amount of water which is added as such to a mix. Since the amount of water contained in the aggregates in a stock pile may vary greatly in different parts of the stock pile, or because of rain falling thereon, it is essentially necessary to be able to determine quickly, accurately and directly at the site, the amount of water contained by the aggregates, so that a substantially constant ratio of water to cement may be maintained through accurate control of the water which is added as such. In this manner the desired composition of a concrete mix can be accurately maintained. However, heretofore, no practical, simple and direct method or apparatus has been devised whereby the amounts of water and dry aggregate contained in a wet aggregate can be accurately and quickly determined without the use of intricate devices and the solution of complex equations requiring considerable skill, all of which is tedious and time-consuming. Heretofore, the time required to determine the amount of water and dry aggregate in a wet aggregate has been so great that changes in the amounts of water and dry aggregate in a given wet aggregate could take place without being detected.

An object of the invention is therefore to provide a method of quickly, accurately and directly determining the specific gravity of an aggregate whether surface dry or of any degree of wetness.

A further object of the invention is to provide a quick and accurate method for determining the weight or volume of water contained in a unit weight, say 100 pounds, of wet aggregate of various specific gravities.

A further object of the invention is to provide a quick and accurate method of determining the weight of aggregate on a surface dry basis contained in a unit weight, say 100 pounds, of wet aggregate of various specific gravities.

A further object of the invention is to provide a quick and accurate method of determining the amount of wet aggregate that is equivalent to a unit weight, say 100 pounds, of surface dry aggregate, of various specific gravities.

A further object of the invention is to provide a quick and accurate method for determining the weight or volume of water in the amount of wet aggregate required to produce 100 pounds of surface dry aggregate of various specific gravities.

A further object of the invention is to provide a simple and accurate method whereby the ratio of water to cement in a given concrete mix may be quickly and accurately controlled and maintained substantially constant, even though the water content of the aggregates in a stock pile thereof may vary.

A further object of the invention is to eliminate the solution of many intricate formulae heretofore necessary to obtain any of the aforementioned factors.

A further object of the invention is to eliminate the necessity of drying the aggregate in order to determine the water content thereof.

In accordance with my method, I determine the weight of a unit volume of the aggregates on a surface dry basis, in a stock pile provided at the site or elsewhere, where the concrete is being mixed. Since the specific gravity of surface dry aggregates in a stock pile is generally uniform throughout, I need to determine the weight $W_1$ of a quantity of such aggregate which is surface dry, that will displace a given volume $V_2$ of water only at the commencement of concrete production although check determinations may be made thereafter as often as it may be deemed necessary to catch unexpected variations in the specific gravity on a surface dry basis. I select a volume $V_2$ whose weight is equal to $K_1(1 \cdot 10^n)$ where $K_1$ is a constant and $n$ is a whole number. Thus, if $K$ is equal to unity and $n=1$, the weight of volume $V_2=10$. If the English system of weights is used $V_2$ is equal to 10 pounds. In practice the particular volume $V_2$ selected is one that preferably results in a direct reading of specific gravity.

Having determined the weight of the quantity of surface dry aggregate required to displace a given volume $V_2$ of water, I then determine the weight of a quantity of aggregate in the stock pile as is, that is required to displace the same volume $V_2$ of water. I call this weight $W_2$ (wet aggregate weight), and throughout the specification it is to be understood that the term "wet aggregate" means aggregate that is not surface dry. Having determined the weights $W_1$ and $W_2$ and knowing volume $V_2$, I substitute these values in a simple formula and solve for the percentage of water in a volume $V_2$ of the wet stock pile aggregate. From the values of $W_1$ and $W_2$ and unit volume $V_2$ I can determine directly the specific gravities of the surface dry aggregate and of the wet aggregate.

Knowing the percentage of water in the wet aggregate, I can compute by simple arithmetic the total amount of water in a unit weight of wet aggregate, say, per hundred pounds, and the weight of aggregate on a surface dry basis per 100 pounds of wet aggregate. Therefore, when a given batch of concrete is to be made, the amount of water contained in the total weight of aggregate used in the batch, is subtracted from the total weight of water that the batch requires when the aggregate is computed as surface dry, the difference being the amount of water that is added as such. In this way the ratio of water to cement in a batch of concrete can be controlled to a high degree of accuracy and the method employed for making the determinations of the water content of the aggregate makes it possible to obtain the water content value in a matter of a few minutes' time so that every batch of cement can be made with substantially the same ratio of water to cement.

A description of the apparatus and the manner in which it is used, together with an illustration of a method of design and control of a specified concrete mix will serve to fully explain the several features and advantages of the invention.

In the drawings I have illustrated a simple form of apparatus by which the quantity of water contained in a given weight of wet aggregate may be determined quickly, accurately and directly in the practice of my invention.

In the drawings:

Figure 1 is a view in elevation of a device arranged and constructed for use in practicing the methods of the invention, a portion of the device being broken away and in section;

Fig. 2 is a view in section along line II—II of Figure 1;

Figs. 3 and 4 are views in front and side elevation, respectively, of a modified form of device;

Fig. 5 is a view of a platform scale on which the device shown in Figs. 1 and 2 is mounted for use in the practice of the methods of my invention; and Fig. 6 is a view in section taken on line VI—VI of Fig. 1.

In practicing the method of my invention I use a gravimeter comprising a measuring device 1 (Figs. 1, 2, 5, 6) or a modified form 1' thereof such as shown in Figs. 3 and 4, and a weighing scale 2, of any suitable type such as a platform scale, having a poise or beam 3 which is graduated decimally in the same system of units as that upon which the measuring device 1 or 1' is based. The poise of scale 2 may comprise a tare beam 3a and a net weight beam 3b.

The description of this apparatus and the manner in which it is used, together with an actual method of design and control of a specified concrete mix will serve to fully explain the several features of the invention.

The measuring device 1 comprises a container having a section 4 of relatively large volume $V_1$ and a displacement volume section 5 having a measured displacement volume $V_2$. In the side wall of section 5 I provide a sight glass or gage 6. This glass or gage is scribed with a lower mark zero (0) and an upper mark one (1.0). The displacement of water of volume $V_2$ into section 5 is represented by the height between the "0" and "1.0" marks. The dimensions of section 5 are so proportioned that the displacement of a volume $V_2$ of water into it will provide a substantial distance between marks "0" and "1.0." A plate 7 behind the glass 6 is fastened along its sides to section 5. Plate 7 is placed to allow free clearance between it and the glass 6. The space between plate 7 and glass 6 is open at the top and bottom, thereby allowing free access of water to this space. The side of plate 7 toward the glass has a light color so as to make the "0" and "1.0" marks on the glass plainly visible. Plate 7 cuts down the effect of wave action of the water in section 5 and makes the sighting of the water level more accurate.

In Figs. 3 and 4 I have shown a modified device 1' that is provided with substantially a square or rectangular $V_1$ section having a sloping bottom wall 10 and a hinged side wall 11. The hinged side wall 11 is so constructed that it may be clamped in closed position by a clamp bar 12, that can be driven into the jaws of keepers 13 secured to the side walls adjacent to side wall 11. A gasket or other suitable means may be provided to effect a watertight joint around the margin of wall 11 when in closed position. The device as shown in Fig. 3 and 4, may be emptied by merely opening side wall 11, and while open the interior thereof may be flushed out with water from a hose to remove particles of sand that may adhere to the inside thereof. Above the $V_1$ section, I provide a volume $V_2$ or displacement section 5' and a glass tube gage 6a, of suitable diameter. The glass gage 6a is open to the $V_1$ section at the bottom and is held in place at the top by a hood 15 which in turn is fastened to the side of section 5'. The hood 15 is pierced as at 16 to allow the escape of air as water rises in the tube. The tube or gage is scribed near the bottom with a zero (0) mark and a unit mark (1.0) at such a height above the zero mark that the volume between these marks corresponds to unit volume $V_1$. When water is displaced into section 5' from the zero mark to the "1.0" mark the volume displaced is $V_2$.

The gages may be calibrated as follows. Scribe the "0" mark near the bottom of the gage. Add water through section 5 until the water level is at "0." This quantity of water corresponds to volume $V_1$. I then add a known weight of water, say 10 pounds, and the height or level to which this added water rises in section 5 determines location of the upper mark "1.0." The known weight of added water that corresponds to the volume between the "zero" and "1.0" marks, I call $V_2$. Having calibrated the gages the device is ready for use. While the construction of measuring devices 1 and 1' are different in detail, and other details of construction may be made, the basic feature of the apparatus is to have a discernable volume section $V_2$ of a known unit or units of water, say 1 or 10 units of volume. When aggregate is added to the $V_1$ section, water will be displaced thereby into the $V_2$ section. In practice, such a quantity of aggregate is added that water will be displaced to the "1.0" mark of the $V_2$ section.

By means of the gravimeter the specific gravity of a surface dry sand or aggregate may be determined as follows: I place container 1 on the platform of scale 2 and add water until the level thereof reaches the "0" mark on gage 6. The slide weight on the tare beam 3a is adjusted until the scale is in balance with the tare weight, i. e., the weight of container 1 and of the volume $V_1$ of water therein. Surface dry aggregate is then introduced through the top of section 5 until water from the $V_1$ section has been displaced from the "0" mark to the "1.0" mark on gage 6. The amount of water so displaced is volume $V_2$ and its weight is by design, say, 10 pounds. The weight on the net weight beam 3b is then adjusted until the scale is in balance. If the net weight is 26 pounds the specific gravity of that particular sand or aggregate on a surface dry basis is 2.6.

To determine the specific gravity of the same sand or aggregate when wet and containing an unknown amount of water I repeat the above procedure as by adding the wet aggregate through the top of section 5 until the quantity introduced into the $V_1$ section displaces water from the zero mark to the "1.0" mark on gage 6. The scale having been balanced for tare weight, I slide the net weight on beam 3b until the scale is in balance. If the scale shows a net weight of 25 pounds the specific gravity is 2.5. The graduations on the wet weight beam 3b may be so calibrated that the scale reads directly the specific gravity as 2.60, in the case of the surface dry sand or 2.50 as in the case of the wet sand or aggregates.

In general terms, I may designate the tare weight (weight of volume $V_1$ of water + weight of container 1) as $W_1$; the weight of volume $V_1$ of water + the weight of container 1 and the volume of aggregate added corresponding to $V_2$, may be designated $W_2$. If the aggregate added is surface dry the weight thereof is $(W_2-W_1)$ and I designate it $W_d$.

If the aggregate added is wet, the weight thereof is $(W_1-W_2)$ and for convenience I designate this weight as $W_w$.

Since by design the weight of volume $V_2$ is 10 pounds, the specific gravity of the surface dry aggregates is $$\frac{W_d}{V_2}=\frac{W_d}{10}=0.1W_d$$

and of the wet aggregate is $$\frac{W_w}{V_2}=\frac{W_w}{10}=0.1W_w$$

To determine the per cent of water in a quantity of wet aggregate of weight $W_w$, the values $V_2$, $W_w$ and $W_d$ are substituted in the equation $$X=\left(\frac{W_w-W_d}{V_2-W_d}\right)$$

This equation is derived as follows:

Let $X$=the volume of water in the sample of aggregate corresponding to volume $V_2$, then $1-X$=the volume of aggregate on a surface dry basis, in a volume of wet aggregate corresponding to volume $V_2$ and $$V_2 \cdot X + W_d(1-X) = W_w \therefore X = \left(\frac{W_w-W_d}{V_2-W_d}\right)$$

If the following values are assigned to $W_w$, $W_d$, $V_2$, i. e., $W_w$=25 lbs., $W_d$=26 pounds and $V_2$=10 pounds, then $$X=\frac{25-26}{10-26}=\frac{1}{16} \text{ or } 0.0625 \text{ or } 6.25\%$$

The pounds of water in 25 pounds of wet sand is therefore $V_2 \cdot 0.0625$ or $10 \cdot 0.0625=0.625$ lb. The weight of aggregate on a surface dry basis, in 25 pounds of aggregate containing 6.25% of water by volume, is $25-0.625=24.375$ ∴ in every 100 pounds of aggregate containing 6.25% of water by volume there is $$\frac{100}{25} \cdot 0.625$$

or 2.5 lbs. of water and 97.5 lbs. of aggregate on a surface dry basis.

The above described method of determining the quantity of water in a sample of aggregate from a stock pile thereof at the site may be performed in only a few minutes' time. Therefore, the operation may be repeated as often as necessary as the stock pile is consumed or as the water content is changed by rainfall or other factors, whereby the water content of the aggregate may be determined for every batch of concrete if need be. The method need not be repeated as frequently for determining the surface dry weight of a volume of aggregate corresponding to volume $V_2$ unless the character of the aggregate has changed, as where the stock pile might contain aggregate from different sources of pits. Having determined the quantity of water in a given weight of wet aggregate to be used in a batch of concrete, the total amount of water added is the difference between the total weight of water required by the batch with aggregate computed on a surface dry basis and the total amount of water in the aggregate going into the batch. Thus, if the total water for a batch is designated TW and the total weight of aggregate for the batch is designated TW_w, then the weight of water to be added as such is $$\left\{TW - \left(\frac{TW_w \cdot X}{W_d}\right)\right\}$$

In the above calculations it is apparent that the weight of device 1 does not affect the values of $W_d$ or $W_w$. However, in use, the device may accumulate dirt which would cause its weight to change. To compensate for this possible variation I may employ a scale having both tare and net weight beams such as indicated by reference numerals 3a and 3b. In such case the weights $W_d$ and $W_w$ will always be true net weights.

To facilitate and supplement the usefulness of the gravimeter, I may provide a set of tables of which Tables I and II are typical. Table I is based on a surface dry aggregate whose specific gravity is 2.60, and shows the amount of water and surface dry aggregate—the aggregate being sand—in a 100 pounds of sand where the wetness varies from zero (surface dry) to that corresponding to a specific gravity of 2.24. The legends at the heads of the various columns are self-explanatory. By means of these tables, and the specific gravities which are determined by the gravimeter, the pertinent information pertaining to the sand can be read on any horizontal line containing the particular value of specific gravity that was indicated by the gravimeter.

Table II is based on an aggregate whose specific gravity surface dry is 2.70.

TABLE I

Specific gravity—Surface dry

[Wt. per C. F. Abs. Vol.=162.50#; Abs. Vol. per 100#=.617 C. F.]

| S. G. Wet Sand | Water per 100# Wet Sand | | Dry Sand in 100# Wet Sand, Lbs. | Wet Sand Required to produce 100# Dry Sand, Lbs. | Water in Sand Required to produce 100# Dry Sand | |
|---|---|---|---|---|---|---|
| | Lbs. | Gals. | | | Lbs. | Gals. |
| 2.60 | 0.000 | 0.000 | 100.000 | 100.000 | 0.000 | 0.000 |
| 2.59 | 0.241 | 0.029 | 99.759 | 100.242 | 0.242 | 0.029 |
| 2.58 | 0.485 | 0.058 | 99.515 | 100.487 | 0.487 | 0.058 |
| 2.57 | 0.730 | 0.088 | 99.270 | 100.735 | 0.735 | 0.088 |
| 2.56 | 0.977 | 0.117 | 99.023 | 100.986 | 0.986 | 0.118 |
| 2.55 | 1.226 | 0.147 | 98.775 | 101.241 | 1.241 | 0.149 |
| 2.54 | 1.476 | 0.177 | 98.524 | 101.499 | 1.499 | 0.180 |
| 2.53 | 1.729 | 0.207 | 98.271 | 101.760 | 1.760 | 0.211 |
| 2.52 | 1.984 | 0.238 | 98.016 | 102.024 | 2.024 | 0.242 |
| 2.51 | 2.241 | 0.269 | 97.759 | 102.292 | 2.292 | 0.275 |
| 2.50 | 2.500 | 0.300 | 97.500 | 102.564 | 2.564 | 0.308 |
| 2.49 | 2.761 | 0.332 | 97.239 | 102.839 | 2.839 | 0.341 |
| 2.48 | 3.024 | 0.363 | 96.976 | 103.119 | 3.119 | 0.374 |
| 2.47 | 3.289 | 0.394 | 96.711 | 103.401 | 3.401 | 0.408 |
| 2.46 | 3.557 | 0.427 | 96.443 | 103.688 | 3.688 | 0.443 |
| 2.45 | 3.827 | 0.459 | 96.173 | 103.979 | 3.979 | 0.478 |
| 2.44 | 4.098 | 0.491 | 95.902 | 104.274 | 4.274 | 0.513 |
| 2.43 | 4.372 | 0.525 | 95.628 | 104.572 | 4.572 | 0.548 |
| 2.42 | 4.649 | 0.558 | 95.351 | 104.875 | 4.875 | 0.585 |
| 2.41 | 4.927 | 0.591 | 95.073 | 105.183 | 5.183 | 0.622 |
| 2.40 | 5.208 | 0.625 | 94.792 | 105.494 | 5.494 | 0.659 |
| 2.39 | 5.492 | 0.659 | 94.508 | 105.811 | 5.811 | 0.697 |
| 2.38 | 5.777 | 0.693 | 94.223 | 106.132 | 6.132 | 0.736 |
| 2.37 | 6.065 | 0.728 | 93.935 | 106.457 | 6.457 | 0.775 |
| 2.36 | 6.356 | 0.763 | 93.644 | 106.787 | 6.787 | 0.814 |
| 2.35 | 6.649 | 0.798 | 93.351 | 107.123 | 7.123 | 0.855 |
| 2.34 | 6.944 | 0.833 | 93.056 | 107.463 | 7.463 | 0.896 |
| 2.33 | 7.243 | 0.869 | 92.757 | 107.879 | 7.879 | 0.945 |
| 2.32 | 7.543 | 0.904 | 92.457 | 108.159 | 8.159 | 0.979 |
| 2.31 | 7.846 | 0.942 | 92.154 | 108.514 | 8.514 | 1.022 |
| 2.30 | 8.152 | 0.978 | 91.848 | 108.876 | 8.767 | 1.052 |
| 2.29 | 8.461 | 1.015 | 91.539 | 109.243 | 9.243 | 1.109 |
| 2.28 | 8.772 | 1.053 | 91.228 | 109.615 | 9.615 | 1.154 |
| 2.27 | 9.086 | 1.090 | 90.914 | 109.994 | 9.994 | 1.199 |
| 2.26 | 9.403 | 1.128 | 90.597 | 110.379 | 10.379 | 1.245 |
| 2.25 | 9.722 | 1.167 | 90.278 | 110.769 | 10.769 | 1.292 |
| 2.24 | 10.045 | 1.205 | 89.955 | 111.166 | 11.166 | 1.340 |

TABLE II

Specific gravity—Surface dry

[Wt. per C. F. Abs. Vol.=168.75#; Abs. Vol. per 100#=.595 C. F.]

| S. G. Wet Sand | Water per 100# Wet Sand | | Dry Sand in 100# Wet Sand, lbs. | Wet Sand Required for 100# Dry Sand, lbs. | Water in Sand Required for 100# Dry Sand | |
|---|---|---|---|---|---|---|
| | lbs. | gals. | | | lbs. | Gals. |
| 2.70 | 0.000 | 0.000 | 100.000 | 100.000 | 0.000 | 0.000 |
| 2.69 | 0.219 | 0.026 | 99.813 | 100.219 | 0.219 | 0.026 |
| 2.68 | 0.439 | 0.053 | 99.561 | 100.441 | 0.441 | 0.053 |
| 2.67 | 0.669 | 0.080 | 99.331 | 100.666 | 0.666 | 0.080 |
| 2.66 | 0.885 | 0.107 | 99.115 | 100.892 | 0.892 | 0.108 |
| 2.65 | 1.110 | 0.133 | 98.890 | 101.122 | 1.122 | 0.135 |
| 2.64 | 1.337 | 0.160 | 98.663 | 101.355 | 1.355 | 0.163 |
| 2.63 | 1.566 | 0.188 | 98.434 | 101.591 | 1.591 | 0.191 |
| 2.62 | 1.796 | 0.214 | 98.204 | 101.829 | 1.829 | 0.219 |
| 2.61 | 2.028 | 0.244 | 97.972 | 102.070 | 2.070 | 0.248 |
| 2.60 | 2.262 | 0.272 | 97.738 | 102.315 | 2.315 | 0.278 |
| 2.59 | 2.498 | 0.300 | 97.502 | 102.562 | 2.562 | 0.308 |
| 2.58 | 2.736 | 0.328 | 97.264 | 102.813 | 2.813 | 0.338 |
| 2.57 | 2.976 | 0.357 | 97.024 | 103.067 | 3.067 | 0.368 |
| 2.56 | 3.217 | 0.386 | 96.783 | 103.324 | 3.324 | 0.399 |
| 2.55 | 3.460 | 0.415 | 96.540 | 103.584 | 3.584 | 0.430 |
| 2.54 | 3.705 | 0.445 | 96.295 | 103.848 | 3.848 | 0.462 |
| 2.53 | 3.953 | 0.475 | 96.047 | 104.115 | 4.115 | 0.494 |
| 2.52 | 4.202 | 0.504 | 95.798 | 104.386 | 4.386 | 0.527 |
| 2.51 | 4.453 | 0.535 | 95.547 | 104.660 | 4.660 | 0.560 |
| 2.50 | 4.706 | 0.565 | 95.294 | 104.938 | 4.938 | 0.593 |
| 2.49 | 4.961 | 0.595 | 95.039 | 105.219 | 5.219 | 0.626 |
| 2.48 | 5.218 | 0.626 | 94.782 | 105.506 | 5.506 | 0.661 |
| 2.47 | 5.477 | 0.657 | 94.523 | 105.795 | 5.795 | 0.696 |
| 2.46 | 5.739 | 0.688 | 94.261 | 106.088 | 6.088 | 0.731 |
| 2.45 | 6.002 | 0.720 | 93.998 | 106.386 | 6.386 | 0.766 |
| 2.44 | 6.268 | 0.752 | 93.732 | 106.687 | 6.687 | 0.803 |
| 2.43 | 6.536 | 0.784 | 93.464 | 106.993 | 6.993 | 0.840 |
| 2.42 | 6.806 | 0.815 | 93.194 | 107.303 | 7.303 | 0.876 |
| 2.41 | 7.078 | 0.849 | 92.922 | 107.618 | 7.618 | 0.914 |
| 2.40 | 7.353 | 0.881 | 92.647 | 107.937 | 7.937 | 0.952 |
| 2.39 | 7.630 | 0.916 | 92.370 | 108.260 | 8.260 | 0.991 |
| 2.38 | 7.909 | 0.949 | 92.091 | 108.588 | 8.588 | 1.031 |
| 2.37 | 8.191 | 0.983 | 91.809 | 108.921 | 8.921 | 1.071 |
| 2.36 | 8.475 | 1.017 | 91.525 | 109.259 | 9.259 | 1.111 |
| 2.35 | 8.761 | 1.052 | 91.239 | 109.602 | 9.602 | 1.152 |
| 2.34 | 9.050 | 1.087 | 90.950 | 109.950 | 9.950 | 1.194 |
| 2.33 | 9.341 | 1.121 | 90.659 | 110.304 | 10.304 | 1.238 |
| 2.32 | 9.635 | 1.156 | 90.365 | 110.662 | 10.662 | 1.280 |
| 2.31 | 9.931 | 1.192 | 90.069 | 111.026 | 11.026 | 1.323 |
| 2.30 | 10.230 | 1.228 | 89.770 | 111.396 | 11.396 | 1.368 |

Since the amount of water in the stock pile aggregates varies in different parts of the stock pile, or from day to day, or especially due to rain upon the stock pile, it is very desirable to be able to compute the water content very quickly in order to maintain the water cement ratio as nearly constant as possible. In conjunction with Tables I and II, I may use a set of tables of which Table III is typical, whereby by means of the gravimeter, tables such as I and II and tables such as III, the design and control of concrete mixes at a construction site, for example, is greatly simplified and facilitated. Thus, the solution of even simple equations necessary to obtain these factors by the use of the gravimeter is eliminated, thereby further greatly reducing the labor and time element involved and leading to greater accuracy of the computations.

The tables such as I and II may be composed of a number of sheets covering surface dry aggregates having specific gravities from 2.50 to 2.90 which spans the probable range of specific gravities of all materials used in ordinary concrete. Since all sheets would be similar, only tables covering aggregates having specific gravities of 2.60 and 2.70 covering a range of wetness from surface dry to a water content of about 10 per cent, which is the limit that sand or fine aggregates could "contain" without inundating, are given herein.

In column 1 of Tables I and II is shown the specific gravity of the material, which is obtained by the use of the gravimeter. In column 2 is shown the pounds of water per 100 pounds of the wet material. In column 3 is shown the gallons of water per 100 pounds of the wet material. In column 4 is shown the pounds of material in the surface dry state per 100 pounds of the wet material. In column 5 is shown the pounds of wet material which would be required to produce 100 pounds of surface dry material. In columns 6 and 7, are shown, respectively, the pounds or gallons of water per 100 pounds of the wet material. The water content is given in both pounds and gallons because some specifications are based on pounds of water per bag of cement, whereas, others are based on gallons of water per bag of cement. The tables can be used with either type of specification.

Tables such as Table III may be used in the design and control of concrete mixes on the basis of the data in tables such as I and II and values of specific gravity obtained by the gravimeter.

be "fines" and a ratio of 4.75 gallons of water per bag of cement, and a slump of 3 inches I first determine the specific gravity of the surface dry aggregates as follows:

A (1) Dry about 30 representative pounds of sand and coarse aggregate until all surface moisture only has evaporated. Aggregates so dried are called surface dry, as opposed to bone dry, in that surface dry aggregates will not absorb water internally.

(2) Set the gravimeter up on a scale which is graduated in 0.01 pound, and fill with water to the "zero" mark. Set this off on the "tare" beam of the scale, or offset the weight by other means if the scale has no tare beam.

(3) Carefully add surface dry fine aggregates

TABLE III

```
 1 Job_____ Date _____
 2 Sand-Origin_____  F. M. 3.08  S. G. S. D. 2.60.  Lbs./c. f. Ab. Vol. 162.50B
 3 Stone-Origin_____            S. G. S. D. 2.70  Lbs./c. f. Ab. Vol. 168.75H
 4 Concrete Class A—Cement—7.25 Bags/c. y.  0.49 c. f. Ab. Vol. /Bag    Sand 45%V
 5                 Water—4.75 Gal./Bag   34.44 Gal./c. y.  7.5 Gal./c. f.
 6 Abs. Vol. 1 c. y.                        27.00 c. f.
 7 Abs. Vol. Cement=7.25×0.49   =3.55
 8 Abs. Vol. Water=7.25×4.75÷7.5=4.59        8.14
 9 Abs. Vol. Aggregates Required =          18.86 c. f.
10
                                                                              Per Cu. Yd.    Per Bag
11 Sand S. D_____18.86×V  .45×B  162.50=1379 Lbs. P
12 Stone S. D_____18.86(100-V) .55×H 168.75=1750 Lbs. R
13 Sand Wet_____0.01P 13.79×E 102.564=1414 Lbs. S÷7.25=195.0 Lbs. S
14 Stone Wet_____0.01R 17.50×L 100.892=1766 Lbs. T÷7.25=243.5 Lbs. T
15 Free Water in Sand_____0.01S 14.14×D 300   =4.24 Gal.
16 Free Water in Stone_____0.01T 17.66×K .107  =1.89 Gal.
17 Total Free Water                                                              6.13 Gal.
18 Water to Add                                                       =34.44−6.13=28.31 Gal.   ÷7.25=3.905 Gal. W
```

| | | | 1 Design Mix Per Bag | 2 Trial Mix Batch | 3 Adjusted Trial Batch | 4 True Batch Mix | 5 Adj. 1 | 6 Adj. 2 | 7 Adj. 3 |
|---|---|---|---|---|---|---|---|---|---|
| 19 | Sand | S. G. Wet_____C__ | 250 | | | | 2.42 | | |
| 20 | | Water/100 # Wet___D__ | .300 | | | | .558 | | |
| 21 | | Wt. Reg. for 100# S. D___E__ | 102.564 | | | | 104.875 | | |
| 22 | | Wt. S. D. per 100# Wet___U__ | 97.50 | | | | | | |
| 23 | Stone | S. G. Wet_____J__ | 2.66 | | Adopted | | 2.61 | | |
| 24 | | Water/100# Wet___K__ | .107 | | | | .244 | | |
| 25 | | Wt. Reg. for 100# S. D___L__ | 100.892 | | | | 102.070 | | |
| 26 | | Wt. S. D. per 100# Wet___Z__ | 99.115 | | | | | | |
| 28 | Cement_____Bags__ | | 1 | 7 | 7 | 7 | 7 | | |
| 29 | Water Reg_____Gals__ | | 4.75 | 33.25 | 33.25 | 33.25 | 33.25 | | |
| 30 | Water in Added | | | | | | S5×D5 | | |
|    | Sand_____0.01S×D__ | | | | 4.31 | | 8.15 | | |
| 31 | Water in Added | | | | | | T5×K5 | | |
|    | Stone_____0.01T×K__ | | | | 1.94 | | 4.47 | | |
| 32 | Water in Sand & Stone | | | | 6.25 | | 12.62 | | |
| 33 | Net Water Added_____W__ | | 3.905 | 27.34 | 27.00 | 33.25 | 20.63 | | |
| 34 | Sand_____S__ | | 195 | 1,365 | 1,435 | 0.01S3×U1 1,399 | S4×E5 1,463 | | |
| 35 | Stone_____T__ | | 244 | 1,705 | 1,810 | 0.01T3×Z1 1,794 | T4×L5 1,831 | | |
| 36 | Slump_____ | | 3″ | 5″ | 3″ | | 3″ | | |
| 37 | Remarks_____ | | | Harsh | O. K. | | O. K. | | |

```
   Yield—True Mix      Ab. Vol.
38 Cement     7 Bags×0.49 = 3.43 c. f.
39 Water     33.25 Gal÷7.5 = 4.43 c. f.
40 Sand S     1399 ÷B 162.50 = 8.61 c. f.
41 Stone T    1794 ÷H 168.75 =10.65 c. f.
42 Total _____27.12 c. f.
```

To demonstrate the practice of my invention and methods and the practical use of the gravimeter and tables, I will give an illustration of the design of a specific concrete mix and a method of control of the true mix by the use of the gravimeter and the tables.

Assuming that a construction project is under way and there is cement, water and stock piles of fine (sand) and coarse (pebbles or crushed rock) aggregates at the site and a concrete is to be made according to specifications requiring approximately 7.25 bags of cement per cubic yard of concrete with 45% of the total aggregates to through the top section 5 until the water rises to the "1.00" mark.

(4) Balance the gravimeter and contents on the weigh beam of the scale. Assume this weight is 26.00 pounds. The surface dry specific gravity of the fine aggregates is then 2.60, therefore, Table I is used in the calculations for fine aggregate.

(5) Proceed as in (2), (3), (4) above with the coarse aggregate and assume this weight is 27.00 pounds. Then the surface dry specific gravity of the coarse aggregate is 2.70. We will therefore use Table II in our calculations for stone. In each case the specific gravity is quickly and directly determined without requiring complicated setups or the solution of any equations or formulas.

B.

I now determine the amount of water and surface drys in the wet stock piles as follows: Proceed exactly as in (2), (3), and (4) of "A" above, but use wet sand from the stock pile and assume this weight is 25.00 pounds. The specific gravity of the wet sand is then 2.50. Proceed exactly as above, using wet stone from the stock pile and assume this weight is 26.60 pounds. Then the specific gravity of the wet stone is 2.66.

On Table I across SG wet sand 2.50 and on Table II 2.70 across line SG wet sand 2.66 we will find all factors required for designing and controlling the concrete mix specified.

These factors, by means of the gravimeter and tables, can thus be determined very simply and accurately, and without the necessity of complicated apparatus or the solution of intricate equations and formulae.

*Design and control of concrete mix*

Concrete mixes are designed on the basis of "Absolute Volume" (Ab. Vol.) of the ingredients. By absolute volume of cement, sand and stone is meant the solid volume displaced by a certain weight of the material, if all voids were eliminated. The weight per cubic foot of absolute volume is equal to the specific gravity $\times$ 62.5 pounds, 62.5 pounds being taken as the weight of a cubic foot of water. The absolute volume per 100 pounds of material $$= \frac{100}{\text{Wt. per C. F. Ab. Vol.}}$$

These factors are given on each sheet of the tables corresponding to Table III. Having determined the specific gravities of the surface dry and wet aggregates, the pertinent factors required for the design are found in the tables and listed in the top panel of Table III. In the center panel, the design of the mix is determined in absolute volume, and reduced to weights of wet aggregates and added water required, by use of the appropriate factors listed above.

In the lower panel the quantities are conveniently listed for making the trial mix and any required adjustments. In column 2 are listed the theoretical mix per cubic yard. In column 3 are listed wet aggregates and added water required per cubic yard.

A form sheet similar to the attached "Form for Concrete Design and Control" should be drawn up as record and aid in conveniently outlining the requirements of the specification, and characteristics of the aggregates to be used, and the logical sequence of the use of the factors from the tables. The line references are to the lines as numbered on the form. We have previously determined by the use of the gravimeter that the surface dry specific gravity of the sand and stone are, respectively, 2.60 and 2.70, and the specific "wet" from the stock pile are, respectively, 2.50 and 2.60. Therefore, we will use, respectively, Table I, line 2.50 and Table II, line 2.66 to find out necessary factors.

*The form*

[The underlined items are taken from the tables.]

*Line 1.*—Enter the name of the job and the date.

*Line 2.*—Enter the origin of the sand, the finis modulus; the specific gravity surface dry=2.60 and the weight per cubic foot volume=162.50 "B"

*Line 3.*—Enter the origin of the stone; the surface dry specific gravity=2.70 and the weight per cubic foot absolute volume=168.75 "H"

*Lines 19 to 22 and lines 23 to 26.*—Enter from the tables in column 1 after the appropriate titles, factors $C$—$D$—$E$—$V$ for sand and $J$—$K$—$L$—$Z$ for the stone.

*Lines 4-5.*—Set out the specification mix,

*Lines 7-8.*—Reduce the cement and water to absolute volume, the total of which is 8.14 cu. ft.

*Line 9.*—1 cu. yd.=27.00 less the absolute volumes of cement and water=18.86 cu. ft. which is the absolute volume of the aggregates required—surface dry (S. D.).

*Line 11.*—The weight of S. D. sand required =18.86 cu. ft. V. (.45%) of sand $\times$ B (where B is equal to 162.50 pounds per cu. ft. Ab. Vol.)=13.79 pounds per cubic yard.

*Line 12.*—The weight of S. D. stone required =18.86$\times$(100—V)$\times$H, (H being equal to 168.75 lbs., the weight per cu. ft. Ab. Vol.)=1750 pounds R per cu. yd.

*Line 13.*—Converts the weight of S. D. sand to the weight of wet or stock pile sand required, =.01P$\times$E (where E=102.564 pounds, the weight of wet sand required to produce 100 pounds of S. D. sand)=1414 pounds of sand "S" per cubic yard. Dividing 1414 pounds by 7.25 (the bags of cement per cu. yd.), the result is 195.50 pounds of sand per bag of cement used.

*Line 14.*—Converts the weight of S. D. stone to the weight of wet or stock pile stone required. .01R$\times$L (where L=100.892, the weight of wet stone required to produce 100 pounds S. D. stone) =1776 pounds "T" per cu. yd. Dividing 1776 by 7.25, the value of 243.5 pounds of stone per bag of cement, is obtained.

*Line 15.*—The free water in the sand=0.01 "S" (14.14)$\times$D (where D=.300 the water per 100 pounds of wet sand)=4.24 gallons.

*Line 16.*—The free water in the stone=.01"T" (17.66) $\times$"K" (where "K"=1.07, the content of water in 100 pounds of wet stone)=1.89 gallons.

*Line 17.*—The sum of water in the sand and stone=6.13 gallons per cu. yd.

*Line 18.*—The amount of water to be added as such is the amount of water required by the specification (34.44 gal.) less the amount of water in the sand and stone (6.13 gal.) or 28.31 gal. Dividing 28.31 by 7.25 we obtain the value 3.905 gal. This value is "W" the amount of water required per bag.

*Line 22.*—Divides the form into columns, with appropriate headings.

*Lines 28 to 37.*—Here are listed the elements entering into the design and control of the mixes.

*Column 1.*—Enter here on line 29 the gallons of water required per bag of cement, i. e., 4.75 and on lines 33—34—35 the amount of added water ("W"), sand ("S") and stone (T) required per bag as determined on lines 12—13—18. Enter on line 36 the desired slump 3 in. Column 1 is the one bag mix as determined from the specifications.

*Column 2.*—The size of the "Batch" mixed on the job depends upon the size of the mixer. We will assume an "ICY" mixer. Since it is simpler and more accurate to handle and control a batch based on full bags of cement, we will use a 7-bag batch. Therefore, in column 2 enter 7 times the amounts shown in column 1. This is the "Trial Mix Batch" which should be run in the mixer.

For pre-job-laboratory design and trial, smaller amounts are used in the same proportions, and then graded up to the actual field batch. After the batch has been run through the mixer, the resulting concrete is examined. Here we find a 5 inch slump instead of the desired 3 inch slump, and in appearance is "harsh" i. e., indicating that proportionately more sand is required. Since the water cement ratio must be held constant, only the amounts of aggregates can be varied.

*Column 3.*—In order to decrease the slump and smooth out the mix, the amounts of sand and stone, respectively, are increased to 1435 pounds and 1810 pounds. On line 29 is the basic water requirement i. e., 33.25 gal. On line 30 is entered the amount of water in the sand $.01S \times D$ (where $D = 14.35 \times 0.300) = 4.31$ gal. Similarly, on line 31 is entered the amount of water in the stone $.01T \times K$, (where $K = 18.10 \times .107$). The sum of these two values i. e. (6.25 gal. line 32) is subtracted from the water required (33.25 − 6.25), which shows that 27.00 gallons are to be added as such at the mixer. This adjusted batch is then run through the mixer, and if it is found to have a 3 inch slump and to be otherwise satisfactory, this mix is then adopted as the mix for the job.

*Column 4.*—Since this adopted mix is to be used throughout the work, and knowing the water content of the stock pile will vary, the actual wet sand and stone quantities of the adopted mix are converted to their surface dry equivalents, to obtain a "True Batch Mix" for future easy control. The weight of wet sand in 100 pounds (14.35) is multiplied by the weight of dry sand per 100 pounds of wet sand ($U1 = 97.50$) and obtain 1399 pounds surface dry—line 34. Similarly, the weight of wet stone in 100 pounds (18.10) is multiplied by the weight of dry stone per 100 pounds of wet stone (Z1 99.115) and obtain 1794 pounds surface dry—line 35. Since these are surface dry quantities there is no water in the materials added, and the amount of water required would remain at the required water cement ratio 33.25 gals.

Control of mix

*Column 5.*—If for any reason the moisture content in the aggregate being used, changes due to digging deeper into the stock pile—rain, etc., we would make new tests with the gravimeter to determine new specific gravities for the wet sand and stone, as previously described. Assume these values, respectively, as 2.42 and 2.61. These are the new values for C, E, J lines 19 and 23. New values of D and E corresponding to S. G. of 2.42 (Sheet 2.66) and of K—L corresponding to S. G. 2.61 (Sheet 2.70 of the tables) are entered on lines 20, 21, 24, 25.

Using the new values of E and L (column 5), the surface dry quantities of sand and stone of the "True Batch Mix" are converted to equivalent weights of wet material.

$(S4 \times E5) = 13.99 \times 104.875 =$
1463 pounds of sand, line 34, and $(T4 \times L5) = 17.44 \times 102.70 = 1831$ pounds of stone. Also, the water constant of these quantities of sand and stone are found by multiplying these weights by the new values of D and K. $(S5 \times D5)$ and $(T5 \times K5)$ equal to 8.15 and 4.47, respectively, and are entered on lines 30 and 31. The sum of these water contents 12.62 (line 32) is then subtracted from the gallons of water required (33.25 gal.—line 29) to obtain the new net amount of water to be added as such = 20.63 gal. (line 33). The quantities then noted in column 5 (adjustment 1) are the quantities needed to maintain the "True Mix" values of cement water, sand and stone, with a change in water content in the aggregates, from the original design. In similar manner further adjustments are made whenever a change in water content is noted in the aggregate being used.

Yield

*Lines 38 to 42.*—At the bottom of the sheet are shown the equations and factors necessary to convert the quantities of the "True Mix" to "Absolute Volumes." The sum of the absolute volumes is the expected yield of the batch. This should be checked occasionally against the amount of concrete deposited in certain measured parts of the forms, to detect any excessive voids in the concrete as placed.

The same type of form can be set up for specifications where the quantities of cement and water are given in pounds instead of bags and gallons. Corresponding factors for the water content is given in the tables in pounds as well as gallons.

The filling out of the chart shows that the design of concrete can be made a quick, simple and accurate operation by use of the gravimeter and the tables. The simplicity and speed with which the actual water content of the aggregate can be accurately obtained and the control calculated will make it desirable to make such control checks at more frequent intervals than has heretofore been possible and lead to the production of more uniform concrete.

Having thus described the invention as it relates to the method of determining the specific gravity, and the water content of the aggregates, the methods of designing concrete and controlling the water cement ratio, and the apparatus and tables adjunct thereto, it will be apparent that various modifications and changes in detail may be made without departing from either the spirit or the scope of the invention. Therefore, what I claim as new and desire to secure by Letters Patent is:

1. A method of determining the specific gravity of comminuted aggregate that consists in (1) weighing a container having therein a quantity of water of weight $W_1$, (2) adding to said water, comminuted aggregate in amount to displace a unit volume of water, said unit volume being equal to $K_1(1 \cdot 10^n)$ where $K_1$ is a constant and $n$ is a whole number, weighing the container, water and aggregate which displaced said volume of water, whereby the specific gravity may be determined by subtracting the second step (2) from the first step (1) and dividing the difference by the weight of the volume $V_2$ of water.

2. The method of determining the percentage of water contained on the surface of the particles of a unit volume of aggregate which consists in determining the following weight and volume values which, when substituted in the equation $$X = \frac{W_w - W_d}{V_2 - W_d} \cdot 100\%$$

where $W_w =$ weight of wet aggregate required to displace a unit volume $V_2$ of water where $V_2 = K_1(1 \cdot 10^n)$, $K_1$ being a constant and $n$ a whole number, $W_d =$ weight of said aggregate on a surface dry basis required to displace said unit volume $V_2$ of water and $X =$ the percent of water in a quantity of wet aggregate of volume $V_2$, said method consisting in (1) adding to a volume of water of weight $W_1$ an amount of wet aggregate sufficient to displace a unit volume $V_2$ of said water, (2) weighing the water and the aggregate added thereto, said weight being $W_2$, where the difference $W_d$ between the weights $W_1$ and $W_2$ may be used in said equation for solving for $X$, the per cent of water in a weight $W_w$ of said aggregate.

3. The method of determining the percentage of water contained on the surfaces of a volume $V_2$ of wet aggregate where $V_2$ is equal to $K_1(1 \cdot 10^n)$, $K_1$ being a constant and $n$ a whole number, which consists in (1) weighing a volume of water of weight $W_2$, (2) adding surface dry aggregate to said water in amount sufficient to displace said volume $V_2$ of said water, (3) weighing said water with the aggregate added, said weight being $W_2$, the difference between $W_1$ and $W_2$ being $W_d$, (4) weighing another volume of water of weight $W_1$, (5) adding said aggregate in a wet state to said volume of water of weight $W_1$ in amount sufficient to displace a volume equal to said volume $V_2$, (6) weighing said water and added wet aggregate, said weight being $W_w$, whereby the percentage $X$ of moisture may be determined from the equation $$X = \frac{W_w - W_d}{V_2 - W_d} \cdot 100\%$$

where $X$ is the percentage of water in said volume $V_2$ of said wet aggregate.

LOUIS H. SCHAEPERKLAUS.

References Cited in the file of this patent

UNITED STATES PATENTS

| Number | Name | Date |
|---|---|---|
| 1,749,606 | Robb | Mar. 4, 1930 |
| 2,067,742 | Weckerly | Jan. 12, 1937 |
| 2,090,421 | Larmour | Aug. 17, 1937 |
| 2,280,617 | Bell | Apr. 21, 1942 |
| 2,287,027 | Cummins | June 23, 1942 |

FOREIGN PATENTS

| Number | Country | Date |
|---|---|---|
| 515,921 | Great Britain | Dec. 18, 1939 |